(12) United States Patent
Felsenthal

(10) Patent No.: US 7,124,884 B2
(45) Date of Patent: Oct. 24, 2006

(54) GARMENT BAG POCKET ASSEMBLY

(76) Inventor: Donald H. Felsenthal, 5999 Wood Trail Dr., Memphis, TN (US) 38120

(*) Notice: Subject to any disclaimer, the term of this patent is extended or adjusted under 35 U.S.C. 154(b) by 351 days.

(21) Appl. No.: 09/971,625

(22) Filed: Oct. 9, 2001

(65) Prior Publication Data

US 2003/0066767 A1   Apr. 10, 2003

Related U.S. Application Data

(63) Continuation of application No. 08/732,774, filed on Dec. 11, 2000, now Pat. No. 6,467,613.

(60) Provisional application No. 60/250,892, filed on May 24, 2000.

(51) Int. Cl.
   *B65D 85/18* (2006.01)

(52) U.S. Cl. .................. 206/278; 206/213; 206/287

(58) Field of Classification Search .......... 206/278, 206/287, 213; 383/39
   See application file for complete search history.

(56) References Cited

U.S. PATENT DOCUMENTS

| | | | |
|---|---|---|---|
| 1,066,265 A | 7/1913 | Freid | |
| 1,658,596 A | 2/1928 | Goldish | |
| 2,591,277 A * | 4/1952 | Mintz | 206/113 |
| 2,606,636 A * | 8/1952 | Braverman | 206/287.1 |
| 2,619,225 A * | 11/1952 | Mintz | 206/113 |
| 2,645,541 A * | 7/1953 | Mintz et al. | 206/287 |
| 2,755,013 A | 7/1956 | Beede | |
| 2,774,450 A * | 12/1956 | Smallberg | 190/127 |
| 2,793,742 A * | 5/1957 | Mintz | 206/113 |
| 2,801,737 A * | 8/1957 | Derman | 206/213 |
| 2,821,295 A * | 1/1958 | Marks | 206/113 |
| 4,923,745 A | 5/1990 | Wolfert et al. | |
| 5,002,183 A | 3/1991 | Okano | |
| 6,467,613 B1 * | 10/2002 | Felsenthal | 206/387 X |

* cited by examiner

*Primary Examiner*—Tri M. Mai
(74) *Attorney, Agent, or Firm*—Todd A. Vaughn; Breneman & Georges

(57) ABSTRACT

A garment container has a plurality of panels, at least one of which has an opening formed therein. The panels are capable of containing at least one garment between them. A pocket is installed in the opening and is configured to hold a chemical composition in an interior thereof. A zipper provides access into the interior of the pocket. The pocket has a gas-impermeable front surface and a back surface perforated with vents to allow vapor from the chemical composition to pass therethrough to treat the garment contained between the panels. The back surface of the pocket may be gas-impermeable. The garment container may be a rectangular hanging bag for a single garment, a square-topped hanging bag for multiple garments, a clothes trunk, an underbed storage box or a portable closet.

8 Claims, 5 Drawing Sheets

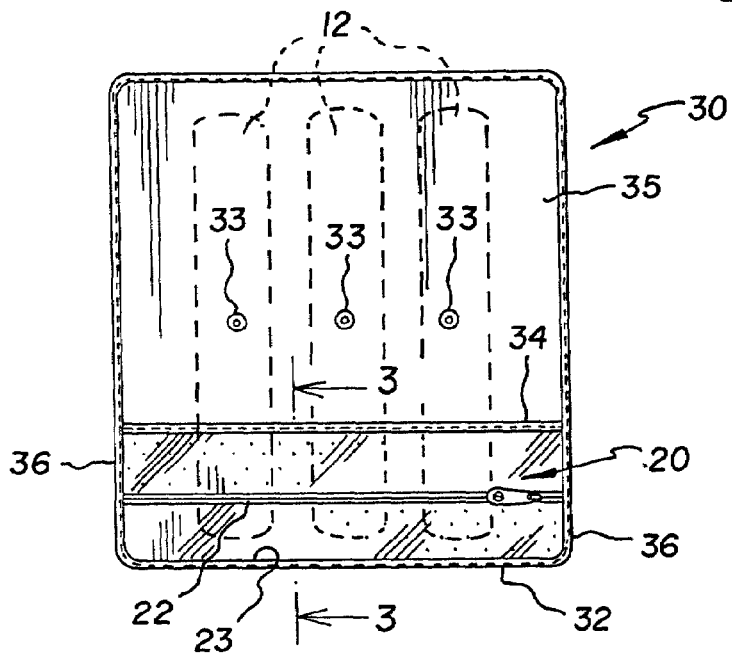

GARMENT BAG POCKET ASSEMBLY

CROSS-REFERENCE TO RELATED APPLICATIONS

This application is a con of Ser. No. 08/732,774, U.S. Pat. No. 6,467,613, filed Dec. 11, 2000, which itself claims the benefit of U.S. Provisional Patent Application Ser. No. 60/250,892, filed May 24, 2000, under 35 U.S.C. §119(e).

BACKGROUND OF THE INVENTION

1. Field of the Invention

The present invention relates to a garment container having a pocket for accommodating therein one or more chemical compositions, such as insecticides, deodorants, demoisturizing agents, antimicrobial agents and the like, which are effective for the protection of garments.

2. Discussion of the Prior Art

The prior art has used various methods and garment bag structures to provide access for fumigants into the garment bag. Fumigants have long been employed to protect the contents of the garment bag from damage by moths and the like. The best and most common fumigant for this purpose has been and continues to be paradichlorobenzene which is the typical component in moth balls.

It is known in the prior art that alternative fumigants may be used. Alternatives to paradichlorobenzene are the following insecticidal substances which may be used by themselves or in a combination with one another or with other insecticidal substances: chlorinated hydrocarbons such as lindane or methoxychlor; phosphoric acid esters such as chlorpyrifos, chlorpyrifos-methyl or dichlorvos; and pyrethroids such as vaprothrin (emphenthrin), permethrin, bioresmethrin, bioallethrin, kadethrin, decis, cyflythrin or fenfluthrin and naturally occurring materials such as aromatic cedar blocks, chips or balls.

Examples of clothing bags that include various arrangements for holding and transferring insecticides into garment bags to protect stored clothing are described in U.S. Pat. No. 1,066,265 issued to Freid on Jul. 1, 1913; U.S. Pat. No. 1,658,596 issued to Goldish on Feb. 7, 1928; U.S. Pat. No. 2,755,013 issued to Beede on Jul. 17, 1956; U.S. Pat. No. 4,923,745 issued to Wolfert et al. on May 8, 1990; and U.S. Pat. No. 5,002,183 issued to Okano on Mar. 26, 1991.

In U.S. Pat. No. 5,002,183, a clothing bag is disclosed which is comprised of a gas-permeable surface sheet and a gas-impermeable back sheet. These sheets are joined together at their peripheries. A second gas-impermeable sheet is joined at its periphery to the surface sheet of the garment bag to make a pocket for accommodating a chemical therein. The garment bag described in U.S. Pat. No. 5,002,183 is the first to provide an outside pocket on a garment bag that is readily accessible and is comprised of a large permeable surface for introducing fumigants into garment bags.

SUMMARY OF THE INVENTION

In the present invention, the concept of an externally accessible pocket for introducing fumigant into a clothing bag is used. However, the construction of the pocket is such that the need for using a garment bag which is comprised of a gas-permeable surface sheet is eliminated.

In accordance with the present invention, both the front and back panels of a garment bag are made of gas-impermeable material. A portion of the garment bag is cut out to form an opening in either the back or front of the garment bag.

A pocket having (1) a perforated back surface comprised of an impermeable material and (2) an unperforated front surface also comprised of an impermeable material is used to close the opening. The configuration and area of the opening can be varied depending on the size and the shape of the opening desired. The opening is closed by placement of a pocket thereover. The pocket, as noted above, is composed entirely of impermeable material. The front surface of the pocket includes an access means, preferably a zipper, which is preferred over Velcro® closings that have been found to be susceptible to leakage. The zipper allows access to the pocket when opened and effectively seals the front surface of the pocket when closed. The pocket has perforations which pass through the pocket back surface to allow a sublimated fumigant to travel from the pocket into the clothes stored in the bags. The degree of permeability can easily and economically be controlled by changing the size and number of perforations. Moreover, the lower part of the pocket to which the solid source for fumigant gravitates during sublimation is preferably not perforated. The small residue particles resulting from sublimation gravitate to the bottom of the pocket where such residue is collected.

In making the pocket of the present invention, the zipper is sewn into the outside nonperforated piece of polyethylene of the pocket and then such nonperforated front piece is sewn to the perforated piece which is exposed to the interior of the bag when the pocket is in place and covers the cut-out portion of the garment bag. The resulting pocket is then sewn into an opening cut out from any of the gas impermeable surfaces of the garment bag. In this regard, the pocket pouch can be sewn into any part of the bag in which the opening is made. In the case of a hanging suit bag, the pocket can be sewn into the front and/or top. This placement at the top allows for an area of air space to exist between the pocket and the garment in the bag. The garments generally hang from hangers suspended proximate the top of the bag. It is believed that placement at the top permits greater dissemination of the chemical vapors which have the characteristic of gravitating to the bottom so as to provide a greater degree of protection for the garments. For those chemicals which vaporize and which rise upwardly from the perforations the pocket is preferably situated towards the lower section of the bag. On underbed storage boxes or bags, the pocket may be sewn over any opening in the front, back or one or more of the sides of the underbed storage box or bag. The pocket used in the present invention can also be sewn over the openings on one or more of the sides of portable closets. In fact, the pocket of the present invention can be sewn into any type of container that is used to store and protect clothing, linens or other household articles that would benefit from being kept free of insects or other elements that can damage or impregnate the goods with offensive odors.

The pocket used in making the storage containers of the present invention is preferably constructed of polyethylene. Commonly used protective chemicals will not damage polyethylene. Specifically, moth balls and crystals of paradichlorobenzene do not damage polyethylene. Use of polyethylene or other unaffected materials for constructing the pocket permits the other surface materials of the bag to be composed of plastic materials such as PVC, since the chemicals retained in the pouch are not in direct contact with PVC or such other materials used in constructing the bag.

Additionally, the pocket includes a zipper. The zipper teeth may be metallic, polymeric or other nonreactive material which opens and closes easily. It has been found the Velcro® closure devices are more cumbersome to open and close and do not provide a closure as complete as a zipper. The zipper makes it easier for the user merely to zip open and add moth balls or crystals into the pocket as old mothballs or crystals dissipate. The pocket or pouch can also function as a holding space for other garment care products, such as lint brushes and other soil removal products, thereby keeping such products within close and readily accessible proximity to the garment to be treated.

BRIEF DESCRIPTION OF THE DRAWINGS

FIG. 2 is a top plan view of a hanging multiple suit bag according to a second embodiment with a pocket installed in a top panel thereof.

FIG. 3 is a cross-sectional view of the pocket taken along line 3—3 in FIG. 2.

DETAILED DESCRIPTION OF THE INVENTION

Figure 1:
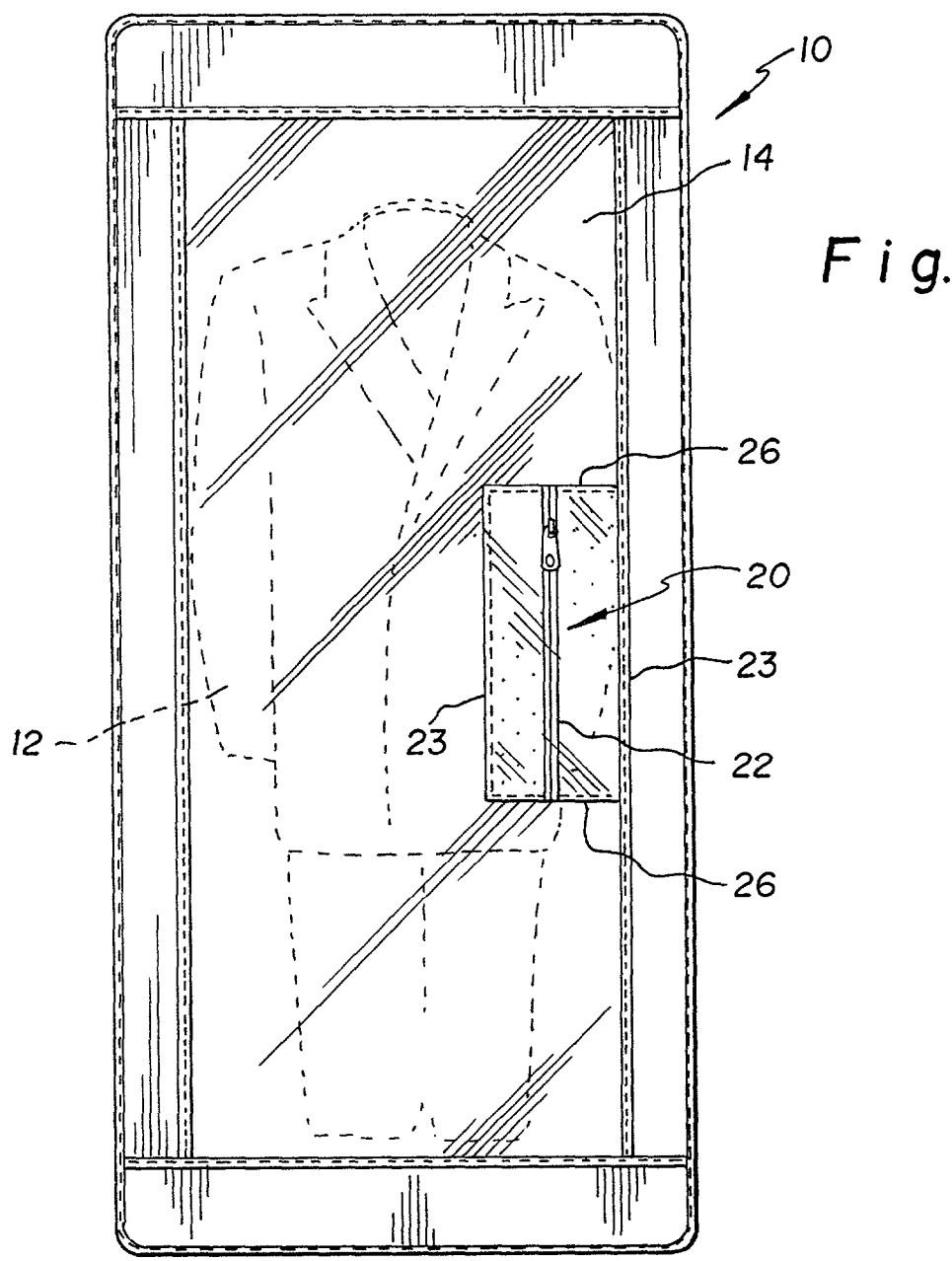
FIG. 1 is a front elevational view of a hanging single-suit bag according to a first embodiment of the invention with a pocket installed in a front panel and with the contents shown in phantom lines.

In FIG. 1, there is shown a rectangular hanging bag 10 of a first embodiment with a plurality of gas-impermeable panels containing a single suit 12 suspended therebetween. In a front panel 14 made of a gas-impermeable material such as vinyl or PVC or other suitable gas-impermeable materials, there is a pocket 20 having a zipper 22 for providing access to an interior of the pocket 20. The zipper 22 is arranged vertically about midway between side edges 23 and extends from a bottom end edge 26 to a top end edge 26. The side edges 23 are about twice as long as the end edges 26. The vertically oriented pocket 20 is aligned in the same direction as the suit 12 in the bag 10. Alternatively, the pocket may be horizontally oriented, aligned perpendicularly to the suit. In this latter embodiment filling is more easily accomplished.

In FIG. 2, there is shown a square-topped hanging bag 30 of a second embodiment with multiple suits 12 suspended therein by hooks (not shown) which extend through a plurality of holes 33 in a top panel 35 made of gas-impermeable material. The pocket 20 is arranged so that one of its side edges 23 coincides with a side edge 32 of the bag 30. The zipper 22 is positioned midway between the side edge 32 and a parallel edge 34 which forms an opening for placement of the pocket 20 therein. The pocket 20 is sewn into the top panel 35 along the side edge 32, the parallel edge 34 and end edges 36.

In FIG. 3, a cross-sectional view of the pocket 20 is shown with the zipper 22 sewn therein. The pocket 20 is placed in the opening of the top panel 35 and is sewn therein by stitches S along the side edge 32 and the parallel edge 34. The pocket 20 is configured to hold moth balls or crystals E placed inside the pocket 20. The chemical compositions of the moth balls or crystals R are allowed to evaporate so that vapor V passes through vents 24 perforated in a gas-impermeable back surface 21 of the pocket 20. The vapor V cannot escape through the zipper 22 and a clear front surface 25 for viewing the crystals R because the front surface 25 is made of gas-impermeable material, such as polyethylene. The vapor V surrounds, protects and treats suits 12 and any other clothing which may be hanging on hooks 36 which extend through the holes 33 in the top panel 35.

Figure 4:
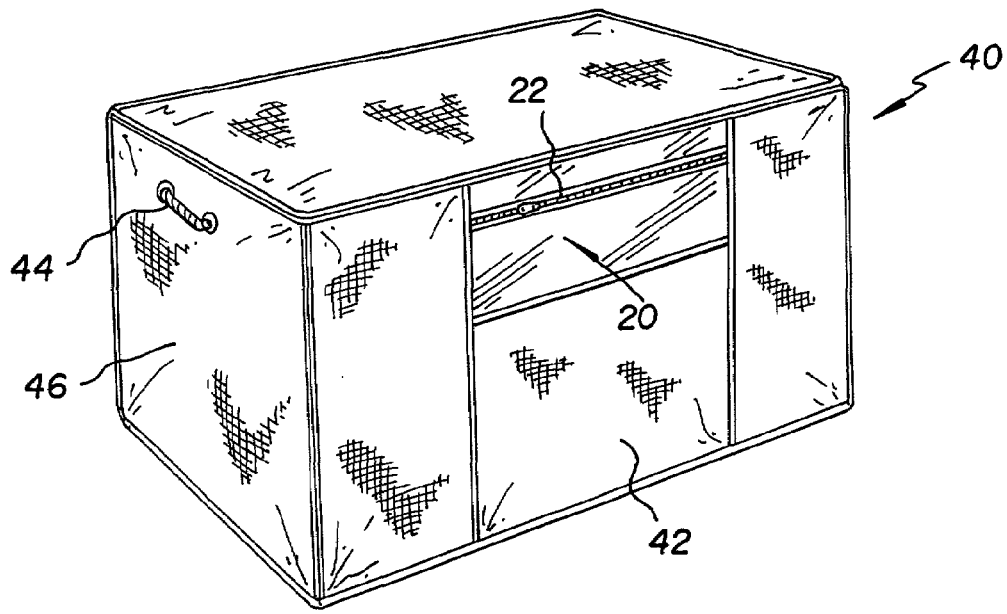
FIG. 4 is a left perspective view of a clothing trunk according to a third embodiment with a pocket being installed in a front panel and having a zipper arranged about midway across the pocket.

In FIG. 4, there is shown a clothing trunk 40 of a third embodiment having the pocket 20 sewn into a front panel 42 in the same manner as the first and second embodiment seen in FIGS. 1–3. Note that the zipper 22 is arranged somewhat more than midway across the pocket 20. The clothing trunk 40 has a strap handle 44 attached to an end panel 46 for dragging the clothing trunk 40 across the floor if the trunk 40 is heavily loaded. The use of two handles at both ends (not shown) will facilitate lifting.

Figure 5:
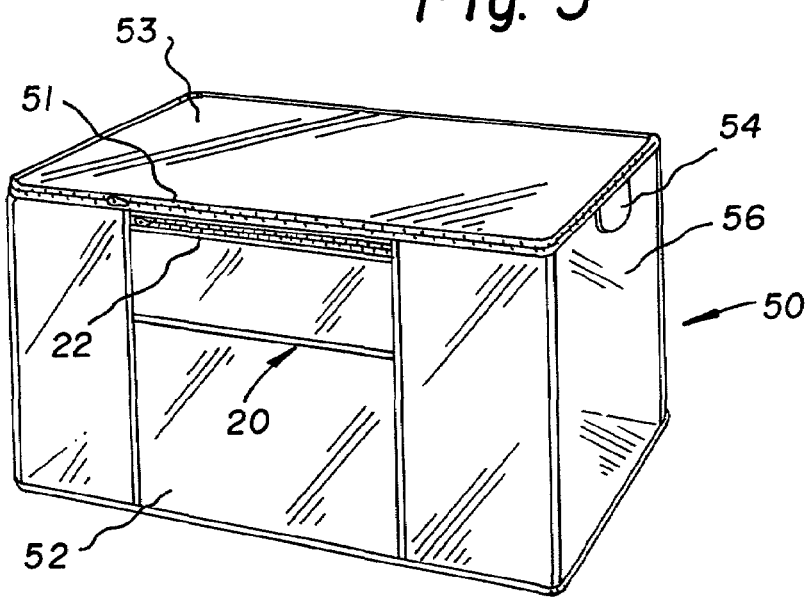
FIG. 5 is a right perspective view of a modified clothing trunk according to the third embodiment with a pocket having a zipper arranged along a top edge of the pocket.

In FIG. 5, there is shown a modified clothing trunk 50 of the third embodiment also having the pocket 20 sewn into a front panel 52 in the same manner as the clothing trunk 40 in FIG. 4. However, the clothing trunk 50 of FIG. 5 has the zipper 22 arranged along a top edge 51 of a top panel 53 of the trunk 50. There are two advantages of this arrangement over the trunk 40 seen in FIG. 4. First, the owner of the trunk 50 in FIG. 5 may completely fill the pocket 20 with moth balls so that more time elapses before needing to replenish the pocket 20. Second, a manufacturer can save time, material and labor costs in making the trunk 50 because the top edge 54 of the top panel 56 also serves as a side edge of the pocket 20. Note that the trunk 50 also has a handle 54 in an end panel 56 for pulling the trunk 50. Here again for lifting, handles at both ends can be provided.

Figure 6:
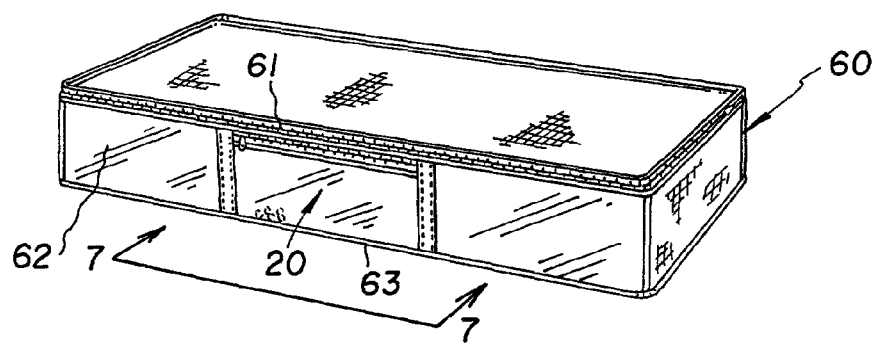
FIG. 6 is a right perspective view of an underbed storage box according to a fourth embodiment with a pocket being installed in a side panel and having a zipper arranged along a top edge of the pocket.

In FIG. 6, an underbed storage box 60 of a fourth embodiment is shown with the pocket 20 extending from a top edge 61 to a bottom edge 63 of a side panel 62. There are two advantages of this arrangement. First, the owner of the storage box 60 can completely refill the pocket 20 without the need to remove the box 60 from under a bed merely by unzipping the pocket 20 along a bottom edge of the bed and placing fresh moth balls therein. Second, the manufacturer can save additional time, material and labor costs in making the box 60 because the top edge 61 and the bottom edge 63 of the side panel 62 also serve as side edges of the pocket 20.

Figure 7:
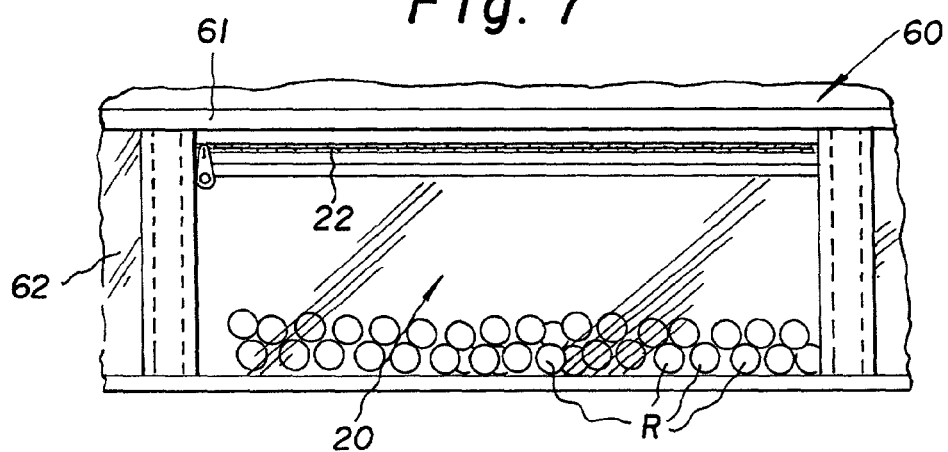
FIG. 7 is a detailed side elevational view of the underbed storage box with the pocket taken along line 7—7 in FIG. 6.

In FIG. 7, there is shown a detailed view of the storage box 60 with the pocket 20 which is only partially filled with moth balls or crystals R. Note that the zipper 22 is secured along the top edge 61 of the side panel 62 of the storage box 60.

Figure 8:
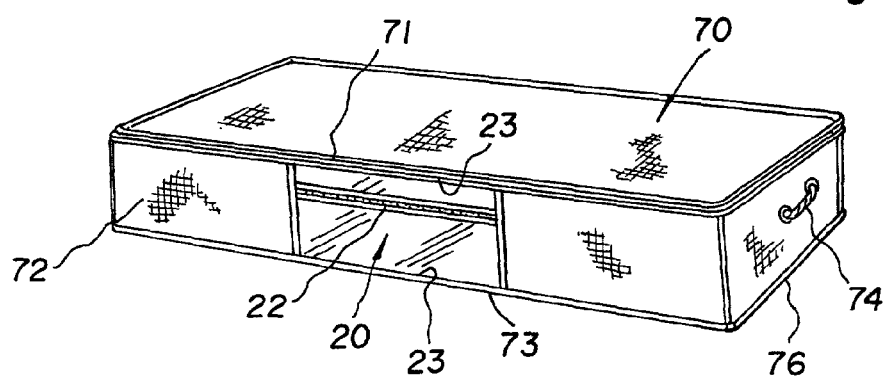
FIG. 8 is a right perspective view of a modified underbed storage box according to the fourth embodiment with the pocket being installed in the side panel and having the zipper arranged about midway across the pocket.

In FIG. 8, a modified underbed storage box 70 of the fourth embodiment is shown with the pocket 20 installed in a side panel 72. Again, a top edge 71 and a bottom edge 73 of the side panel 72 form and coincide with the side edges 23 of the pocket 20. However, note that the zipper 22 is arranged horizontally more than midway up across the pocket 20. One advantage of the box 70 over the box 60 shown in FIG. 6 is that the box 70 in FIG. 8 has a strap handle 74 in an end panel 76 so that the box 70 may be pulled out from underneath a bed by its owner from one end of the bed instead of from a side of the bed. Thus, the owner's choice of either box 60 in FIG. 5 or box 70 in FIG. 8 may depend upon the available floor space next to the bed in the owner's sleeping quarters.

Figure 9:
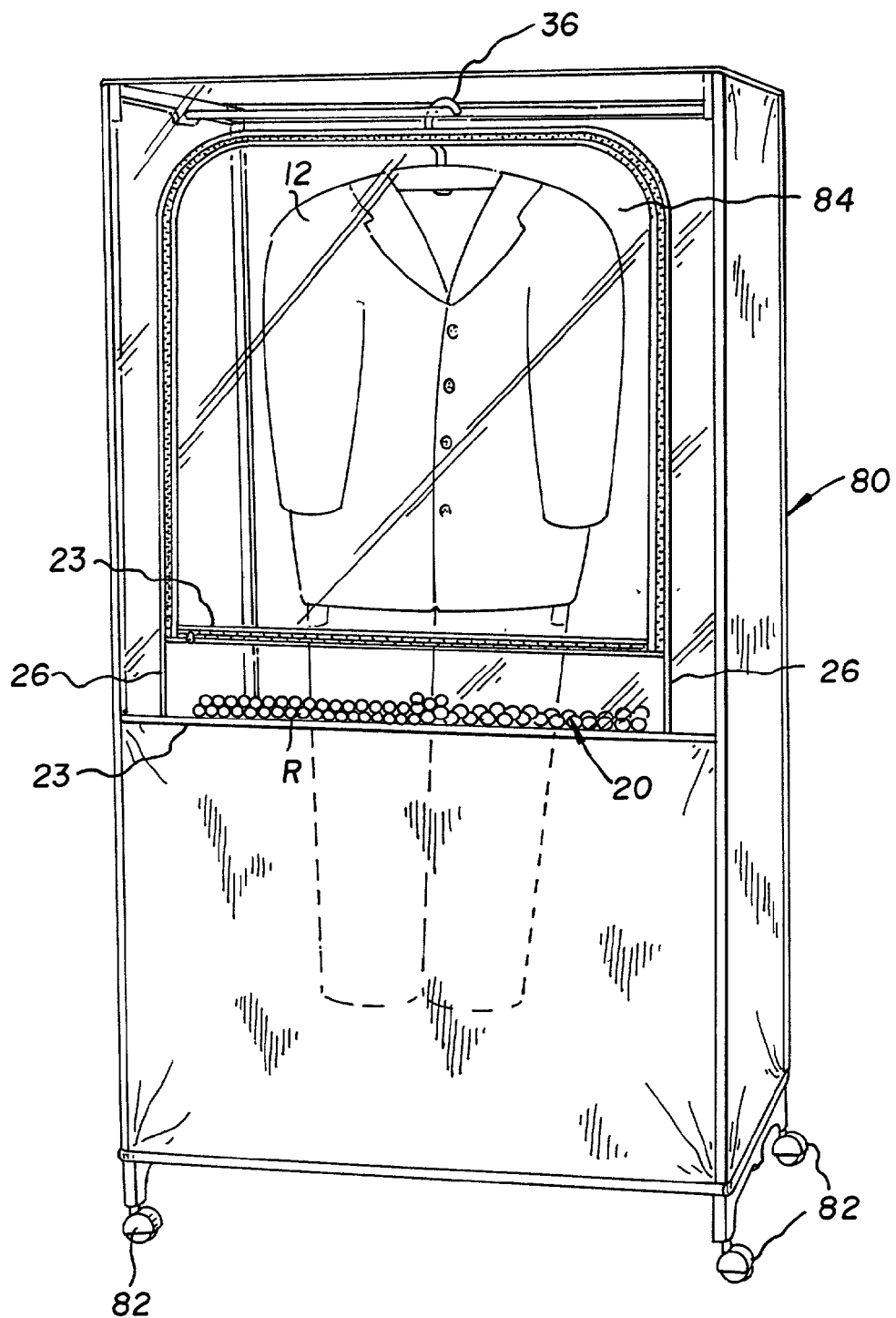
FIG. 9 is a right perspective view of a portable closet according to a fifth embodiment with a pocket installed in a front panel and having a zipper arranged along a top edge of the pocket.

In FIG. 9, there is shown a portable closet 80 of a fifth embodiment with the pocket 20 installed completely across a front panel 84 made of gas-impermeable material. Note that the pocket 20 may be elongated, i.e., a length of its side edges 23 may be about five times as long as a height of its end edges 26. Also, the pocket 20 is aligned in a direction perpendicular to the suits 12. Accordingly, the moth balls or crystals R may be placed in the pocket 20 so that their vapors may have better access to the suits 12 or other clothing hanging therein on hooks 36. Note that the closet 80 has four wheels 82 which permit the owner to push or pull the closet 80 from one corner to another corner in a room or from room to room, as needed.

While five embodiments of a garment container have been described, it is understood that the invention is not limited thereby but rather encompasses other modifications. For example, the pocket 20 may be formed in any shape and may be placed in any panel of the bags 20, trunks 40 and 50, boxes 60 and 70, and closet 80. Also, the plurality of panels may be only a front panel 14 and a back panel. Likewise, the plurality of panels may number at least six, as in trunks 40 and 50, boxes 60 and 70, and the closet 80.

In all cases, the accompanying claims define the scope of the invention and the foregoing embodiments are merely illustrative examples thereof.

I claim:

1. A garment container comprising:
    a plurality of panels, at least one of said plurality of panels being a vertical side panel having a vertical side cut-out opening formed therein by cutting out a portion of at least one of said vertical side panel to form at least one cut-out opening, said plurality of panels being capable of containing at least one article of clothing therebetween;
    at least one self-contained closeable pocket composed of a transparent gas impermeable material for closing said cut-out opening of said vertical side panel, said self-contained closeable pocket configured to hold a chemical composition in an interior thereof and having a top edge that coincides with a top edge of said vertical panel and a bottom edge that coincides with a bottom edge of said vertical panel; and
    means for providing access into the interior of the pocket, said means being provided adjacent to and along a top edge of said self-contained closeable pocket to facilitate the complete filling of said pocket with a fumigant so that more time elapses before replenishing said pocket;
    wherein said at least one self-contained closeable pocket has a transparent gas-impermeable front surface and a transparent gas-impermeable back surface, said back surface being perforated with vents disposed at said back surface to which a solid source for said fumigant gravitates to allow vapor from the chemical composition to pass therethrough to treat the garment without a gravitation of small residue particles through said vents.

2. The garment container according to claim 1, wherein said back surface of said self-contained closeable pocket is gas-impermeable.

3. The garment container according to claim 1, wherein said plurality of panels form an underbed storage box.

4. The garment container according to claim 1, wherein two side edges of said self-contained closeable pocket coincides with two side edges of one of the plurality of panels.

5. The garment container according to claim 1, wherein each of said plurality of panels is gas impermeable.

6. The garment container according to claim 1, wherein said means for providing access is a zipper.

7. The garment container according to claim 1, wherein said plurality of panels form a rectangular storage container.

8. The garment container according to claim 1, wherein said self-contained closeable pocket is sewn into said vertical side cut-out opening.

* * * * *